UNITED STATES PATENT OFFICE.

ISAAC NEWTON PEIRCE, OF PHILADELPHIA, PENNSYLVANIA.

IMPROVED COMPOSITION FOR SLATE-SURFACE BLACKING, &c.

Specification forming part of Letters Patent No. 37,639, dated February 10, 1863; Reissue No. 2,095, dated October 24, 1865.

*To all whom it may concern:*

Be it known that I, ISAAC NEWTON PEIRCE, of Philadelphia, in the county of Philadelphia, in the State of Pennsylvania, have invented a new and Improved Slate-Surface or Stone-Surface, of easy application, which readily dries and hardens into a real stone-surface upon wood, plastered wall, glass, metal, printing or other paper, card or paste board, muslin, leather, or any hard smooth substance, and when dry becomes extremely hard, and possesses properties heretofore unknown to any other compound or slate surface—among which are deadness of surface, never reflects or becomes glossy; elasticity, never cracks; adhesiveness, never peels off; extreme hardness, not easily scratched by even iron or steel; insolubility, is not softened by any known liquid; and I do hereby declare that the following is a full description of materials used, and in substantially the following proportions, to make this slate-surface or stone-surface.

The ingredients used, by weight, are combined in the following manner, viz: Take of benzine or petroleum spirits thirty parts; add ground feldspar, or ground emery, or ground quartz, or other ground silicious mineral, forty parts; then incorporate benzine varnish twenty-seven parts—other varnish may answer; then thoroughly mix with it lamp-black, or other dark coloring-matter, three parts. These four ingredients, combined in the manner stated, form the preparation or liquid-stone, and is ready for application with a brush in like manner as paint or varnish, forming a slate-surface or stone-surface wherever such a surface is or may be desired. This surface resists the action of water, alcohol, acids, alkalies, or spirits; receives marks from any kind of slate-pencil, crayon, or chalk, and the marks can again be removed as readily by a dry or damp cloth or sponge as from any real slate; and has proved highly satisfactory, having been subjected to numerous severe tests by competent judges, and pronounced as decidedly the best surface known as a substitute for the real slate or natural stone.

I do not claim giving to wood or card-board merely an imitation of slate surface. This has been partially accomplished heretofore by means of entirely different compositions than those I employ.

What I claim as my invention, and desire to secure by Letters Patent, is—

The use of benzine or petroleum spirits and ground feldspar, or emery or quartz or other silica, in forming a real stone-surface, making use of varnish to make it easier in application and render it more adhesive, and lamp-black or other coloring-matter for a coloring, substantially as set forth, constituting the surface and its application, in the manner and for the purpose specified.

ISAAC NEWTON PEIRCE.

Witnesses:

EDWARD WILLIAMS,
WILLIAM H. BLACK.